United States Patent [19]

Kim

[11] Patent Number: 5,262,903
[45] Date of Patent: Nov. 16, 1993

[54] PROGRAMMED RECORDING METHOD FOR VCR WITHOUT TUNER, AND DEVICE THEREOF

[75] Inventor: In S. Kim, Seoul, Rep. of Korea

[73] Assignee: Goldstar Co., Ltd., Seoul, Rep. of Korea

[21] Appl. No.: 567,603

[22] Filed: Aug. 15, 1990

[30] Foreign Application Priority Data

Aug. 28, 1989 [KR] Rep. of Korea ............. 8912261

[51] Int. Cl.$^5$ .............................................. H04N 5/78
[52] U.S. Cl. .................................. 360/33.1; 360/69; 360/60; 358/335
[58] Field of Search ............... 455/181, 231; 360/33.1, 360/79, 69, 60; 358/335, 191.1, 181; 369/7, 19, 70

[56] References Cited

U.S. PATENT DOCUMENTS

| | | | |
|---|---|---|---|
| 3,962,532 | 6/1976 | Aubert et al. | 360/69 |
| 4,031,548 | 6/1977 | Kato et al. | 360/33.1 |
| 4,271,432 | 6/1981 | Suzuki et al. | 455/231 |
| 4,272,784 | 6/1981 | Saito et al. | 369/7 |
| 4,796,107 | 1/1989 | Hiraki | 358/335 |
| 4,843,482 | 6/1989 | Hegendörfer | 358/335 |
| 5,113,294 | 5/1992 | Kim | 360/33.1 |

FOREIGN PATENT DOCUMENTS 0201258 11/1986 European Pat. Off. ............. 360/60
55-51395 4/1980 Japan ............................. 369/7

*Primary Examiner*—Jerry Smith
*Assistant Examiner*—Steven R. Garland
*Attorney, Agent, or Firm*—Ladas & Parry

[57] ABSTRACT

A programmed recording device for a VCR without a tuner and a method thereof are disclosed. In the programmed recording device, a microprocessor outputs a control signal when carrying out a recording or a playing, and voltage converting means converts the contorl signal of the microprocessor to a voltage. A voltage detection section detects the voltage after receipt of the output of the voltage converting section, and power source switching means are operated by the power source and in according with the voltage detected by the voltage detecting means. A constant voltage circuit converts the AC power source to a constant DC voltage in a state interlocked with the power source switching section in order to activate the TV. According to the present invention, a recording can be started and terminated at the preset time automatically even without a tuner thereby improving the performance of the products.

4 Claims, 3 Drawing Sheets

PROGRAMMED RECORDING METHOD FOR VCR WITHOUT TUNER, AND DEVICE THEREOF

FIELD OF THE INVENTION

The invention relates to a programmable recording control device for a video cassette recorder (hereafter VCR) and a method thereof, and particularly the same for a VCR without a tuner.

BACKGROUND OF THE INVENTION

Some conventional VCRs do not have a TV signal tuner to save manufacturing cost. When a TV broadcast signal is to be recorded in such a VCR without a tuner, the TV has a tuned signal output line to the VCR, but in such a case, programmed recording in the VCR is impossible, because the TV also must be turned on.

SUMMARY OF THE INVENTION

The object of the invention is to perform programmable recording in a VCR without a tuner.

For this, a microprocessor in the VCR outputs a control signal at a programmed recording time. A detector in the TV detects the control signal to switch on the power source of the TV. The tuner of the TV then provides to the VCR the signal for recording.

BRIEF DESCRIPTION OF THE DRAWINGS

The above object and other advantages of the invention will become more apparent from the details of a preferred embodiment that will now be described with reference to the attached drawings in which.

DESCRIPTION OF THE PREFERRED EMBODIMENT

Figure 1:
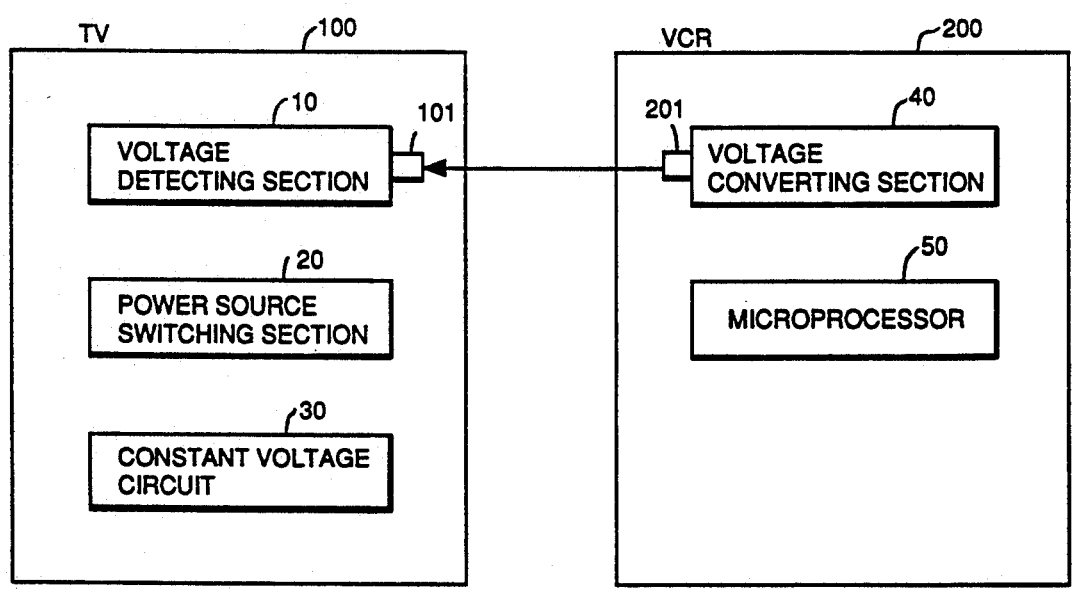
FIG. 1 is a block diagram showing the programmed recording device for a VCR without a tuner according to the present invention.
Figure 2:
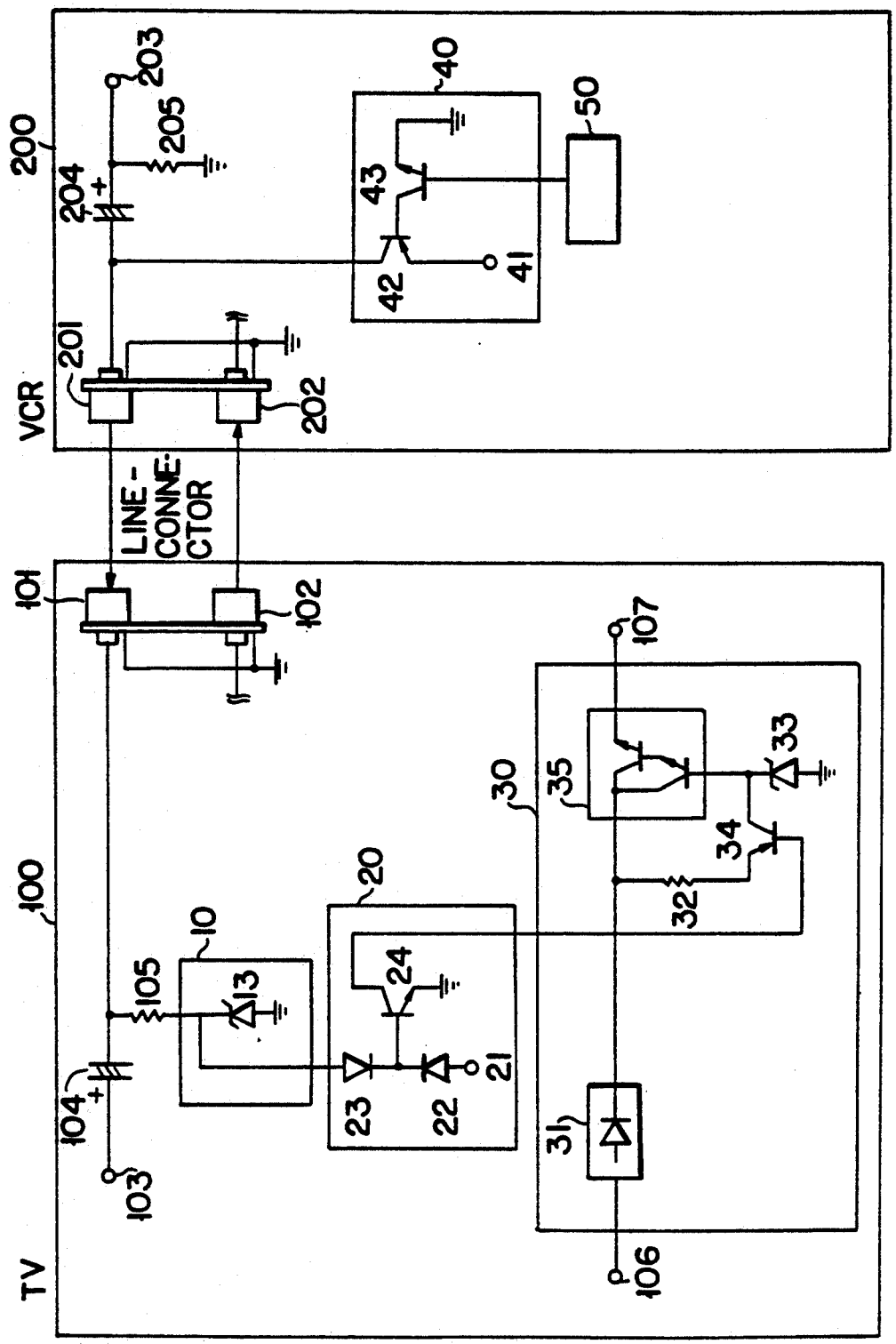
FIG. 2 is a schematic of the device of FIG. 1.

FIGS. 1 and 2 show the programmed recording control device for a VCR 200 without a tuner according to the present invention. When a programmed (user selected) recording time is inputted by a user into a microprocessor 50 of the VCR 200, the microprocessor 50 continually checks the programmed time against the current time, and when the programmed time arrives, the microprocessor 50 outputs a high logic-level signal. The high logic-level signal is inputted into a voltage converting means 40, also of the VCR, to turn on transistors 43, 42, whereby the power (DC 12V) of a source 41 in the VCR is supplied through a video line output terminal 201 and a line connector to a video line input terminal 101 of a TV 100.

The voltage supplied to the terminal 101 is stepped down in a voltage detecting section 10 of the TV by a resistance 105 and by a zener diode 13 in which the zener voltage is 5V. The stepped down voltage (5V) is supplied through a diode 23 of a power source switching section 20 to the base of a transistor 24 to which another TV power source on/off signal is also supplied from terminal 21 through another diode 22.

In other words, the TV can be turned on either from the high logic-level signal of the microprocessor 50 in the VCR or from the terminal 21 of the TV. For this, the transistor 24 activates a transistor 34 of a constant voltage circuit 30. Transistor 34 then activates a constant voltage 12V zener diode 33, which activates a darlington transistor 35. When the darlington transistor 35 is activated, an AC power source on terminal 106 is converted to a constant DC voltage at terminal 107 by a rectifying diode 31 and the darlington transistor 35 to serve as the TV power source.

When the TV is turned on, the image signals of the channel selected by the tuner of the TV are outputted from a video line output terminal 102 of the TV through a line connector to the video line input terminal 202 of the VCR 200 for recording. When programming the recording, therefore, the channel of the TV also has to be set.

Thereafter, when the programmed recording time is terminated, the microprocessor 50 outputs a low level signal so that the TV should be turned off through a procedure reverse to the above-described starting procedure.

Figure 3:
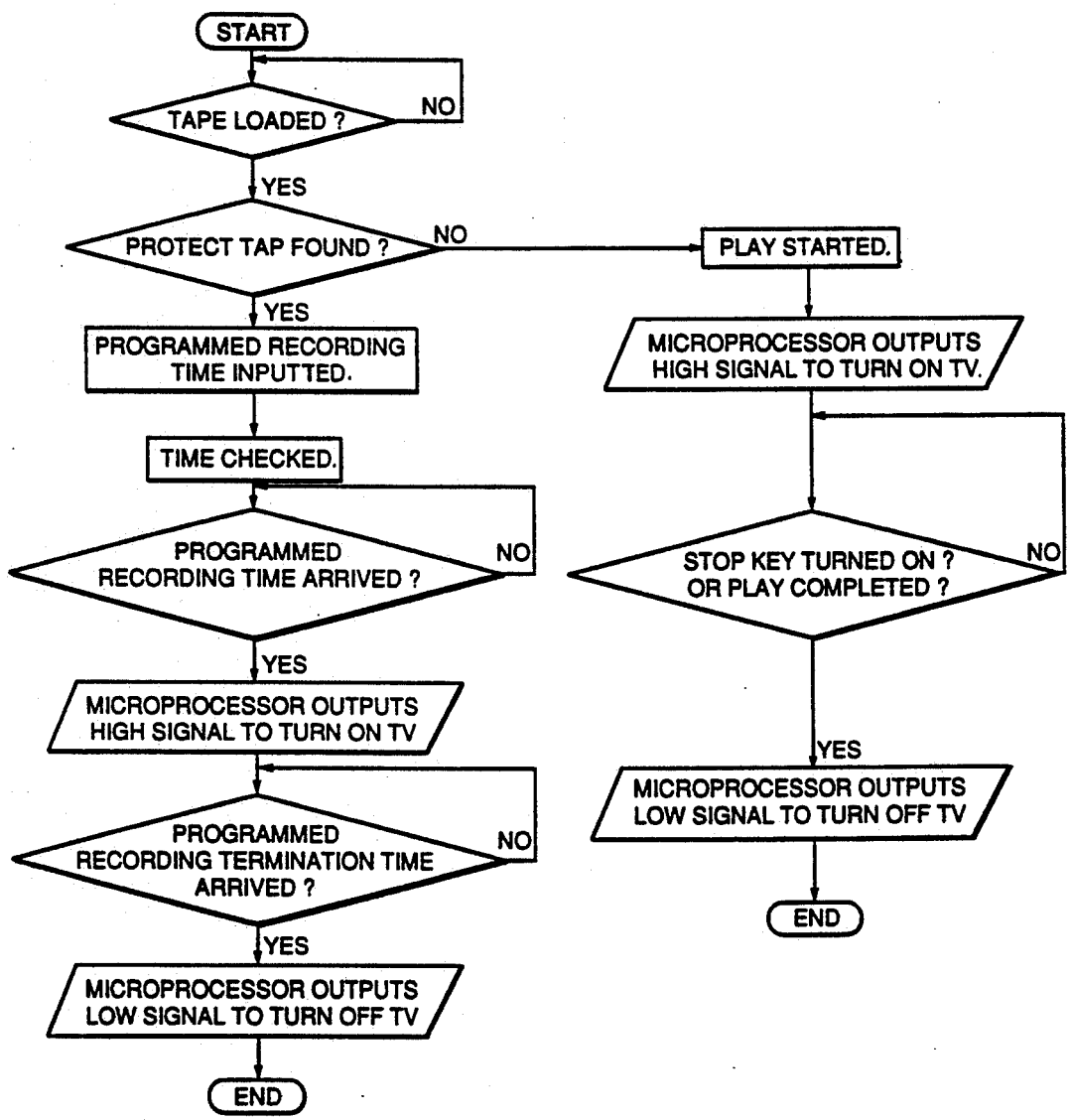
FIG. 3 is a flow chart showing the programmed recording method for the VCR without a tuner according to the present invention.

The flow chart of FIG. 3 shows the programmed recording method for the VCR without a tuner according to the invention.

Also, if the user selects a tape-playing operation microprocessor 50 of the VCR 200 first checks as to whether a video tape cassette has been loaded into the VCR, and if it has, checks whether a protect tap is found on the cassette. If no protect tap is found, a tape-playing operation can be carried out. That is, the microprocessor 50 outputs the high logic-level signal to activate the TV 100 as described above and to carry out a tape-playing operation the user has selected, and when the playing operation is terminated or if a stop key is inputted, the microprocessor 50 outputs a low logic-level signal to stop the operation of the TV 100.

In the programmed recording method, if a protect tap is found, the current time is continuously checked against the programmed recording time, and when the programmed recording time arrives, the microprocessor 50 outputs the high logic-level signal to activate the TV 100 as previously described at the channel of the tuner of the TV set for the programmed recording. The microprocessor 50 then continues to check the current time continuously, and when the programmed recording termination time arrives, the microprocessor 50 outputs the low logic-level signal to turn off the TV.

According to the programmed recording device and method for the VCR without a tuner as described above, therefore, the desired channel is set on the tuner and the programmed recording time is set on the VCR. The TV is then turned on automatically at the programmed recording time to record the desired broadcast signal and turned off upon termination of the programmed recording time.

What is claimed is:

1. A programmed recording method for a VCR without a tuner and a TV with a tuner, the method comprising the steps of:
   (a) inputting into a VCR without a tuner programmed start and stop recording times at which to start recording and to stop recording, respectively;
   (b) detecting whether a protect tab is found on a videotape cassette loaded into the VCR;
   (c) determining in the VCR whether a current time has reached the start recording time if the protect tab is detected on the cassette;

(d) first supplying a first control signal through a first line connector from the VCR to a TV with a tuner when the current time has reached the start recording time;
(e) activating the TV with the first control signal;
(f) selecting one of channel signals received by the TV with the tuner of the TV, the tuner having been set before the first supplying of the first control signal to predetermine the one selected channel signal;
(g) supplying the selected channel signal through a second line connector from the TV to the VCR;
(h) recording the supplied selected channel signal in the cassette with the VCR;
(i) determining in the VCR whether the current time has reached the stop recording time;
(j) then supplying a second control signal through the first line connector when the current time has reached the stop recording time; and
(k) deactivating the TV with the then-supplied second control signal.

2. A programmed recording method as claimed in claim 1, wherein the activating and first supplying steps comprises:
 (a) converting a HIGH level signal of a microprocessor in the VCR to a first voltage; and
 (b) supplying the first voltage to the TV as the first control signal for activating the TV.

3. A programmed recording method as claimed in claim 2, wherein the then supplying and deactivating steps comprise:
 (a) converting a LOW level signal of a microprocessor in the VCR to a second voltage; and
 (b) supplying the second voltage to the TV as the second control signal for deactivating the TV.

4. A programmed recording method as claimed in claim 1, wherein the then supplying and deactivating steps comprise:
 (a) converting a LOW level signal of a microprocessor in the VCR to a second voltage; and
 (b) supplying the second voltage to the TV as the second control signal for deactivating the TV.

* * * * *